April 1, 1958     C. C. HAMMACK     2,828,781
HOT BEVERAGE DISPENSING APPARATUS FOR MOTOR VEHICLES
Filed Oct. 4, 1956     2 Sheets-Sheet 1
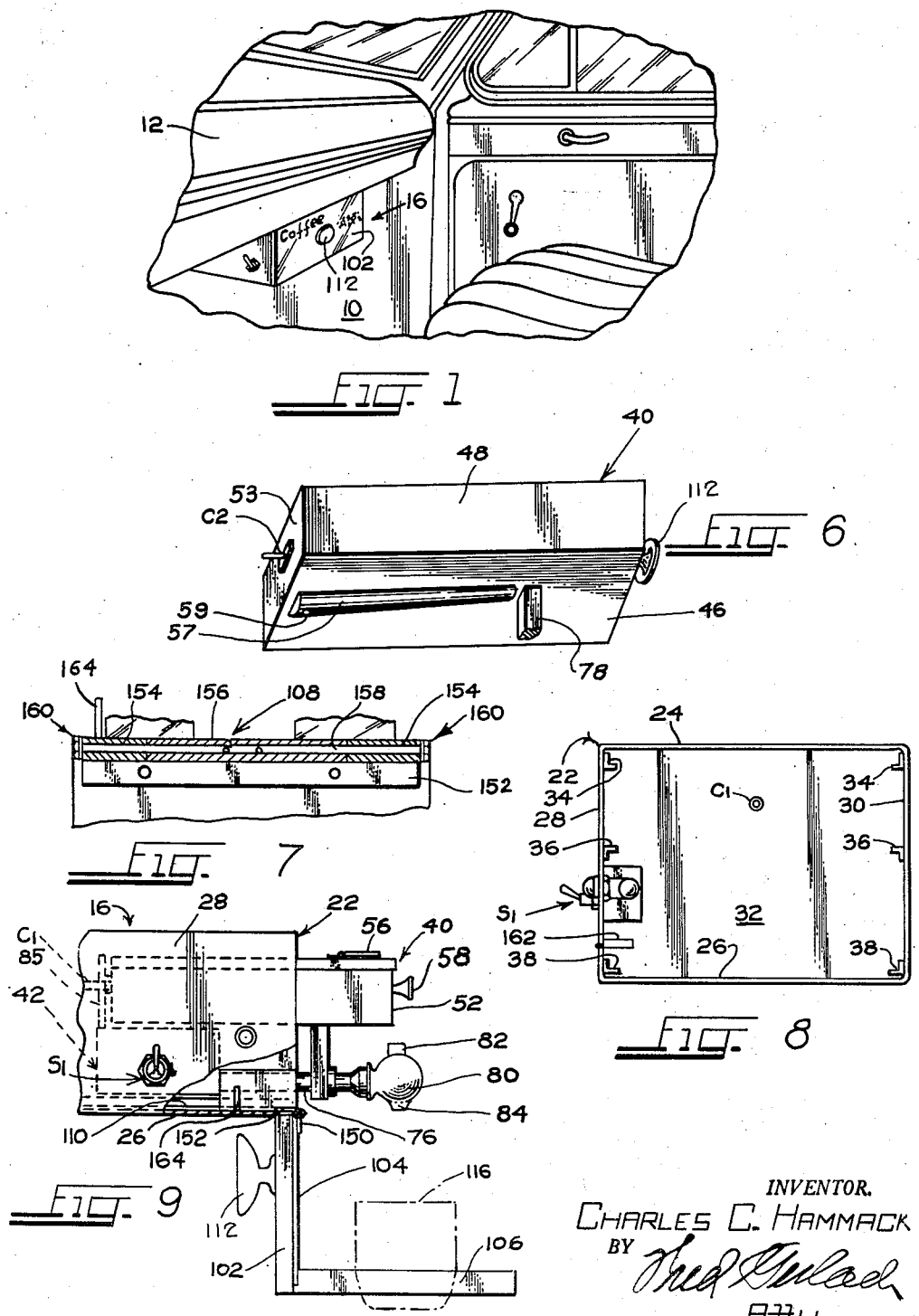
INVENTOR.
CHARLES C. HAMMACK
BY
ATTY.

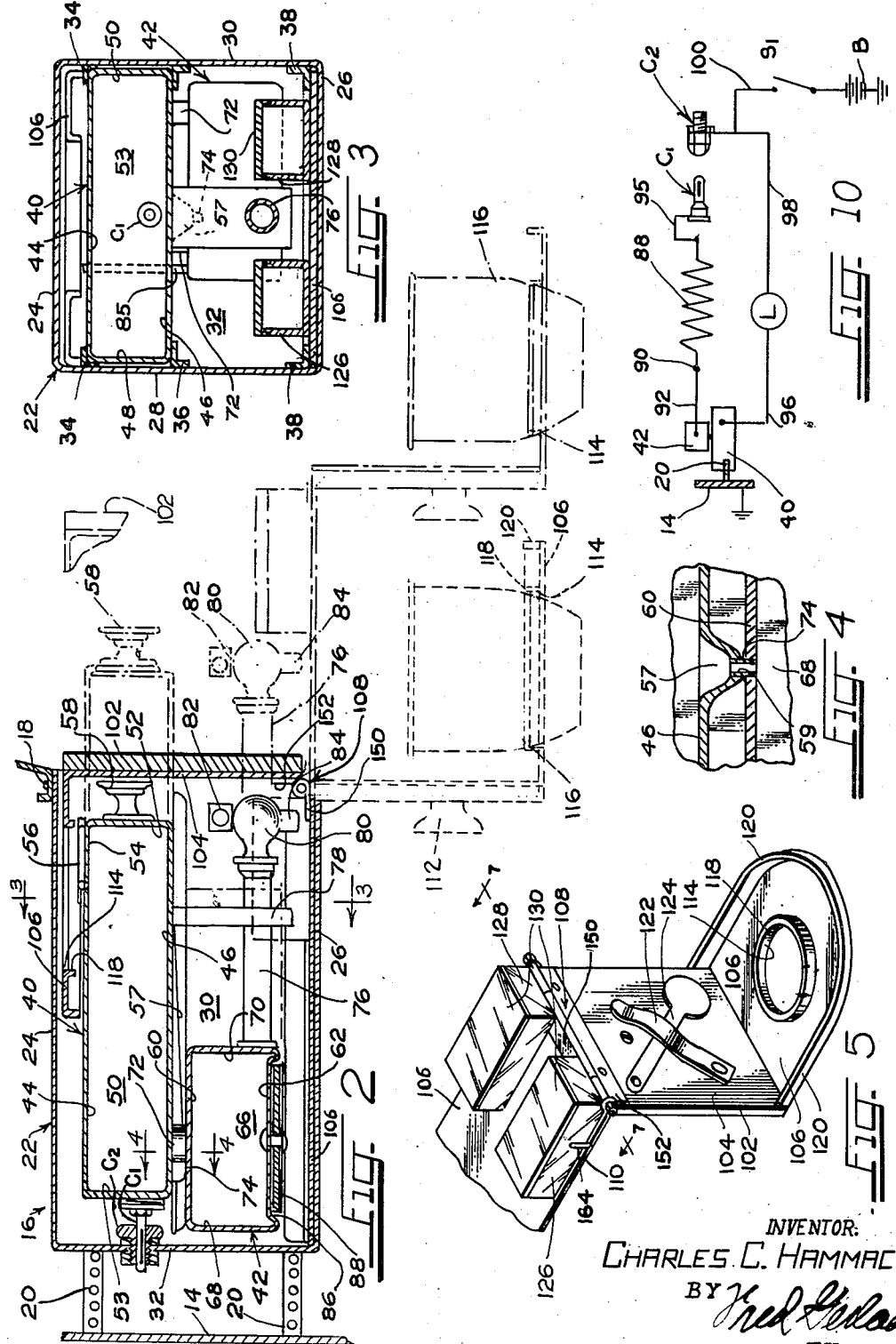

United States Patent Office 2,828,781
Patented Apr. 1, 1958

2,828,781

HOT BEVERAGE DISPENSING APPARATUS FOR MOTOR VEHICLES

Charles C. Hammack, Barrington, Ill.

Application October 4, 1956, Serial No. 613,908

16 Claims. (Cl. 141—82)

The present invention relates to beverage dispensing apparatus and has particular reference to an improved water heating device whereby relatively small quantities of water are withdrawn from a larger supply thereof, heated and made conveniently available for the preparation of hot beverages, utilizing soluble or so-called "instant" preparations such as coffee or a coffee substitute, tea, chocolate, bullion and the like.

The improved dispensing apparatus of the present invention has been designed for use primarily in connection with motor vehicles such as automobiles, trucks, tractors and the like wherein the apparatus is adapted to be mounted on the vehicle in a non-interfering position, as for example beneath the instrument panel where the same is readily accessible for use by the driver or other occupants of the vehicle. The invention is however capable of other uses and the same may, if desired, with or without modification, be employed for the dispensing of beverages in small navigable craft whether the same be of the water or air-borne variety. Irrespective, however, of the particular use to which the invention may be put, the essential features thereof are at all times preserved.

It is among the principal objects of the present invention to provide a relatively small and compact hot beverage unit capable of being readily mounted in a motor vehicle as an accessory and including a relatively large capacity storage tank or reservoir for water and an adjacent relatively small heating and dispensing tank which is arranged in heat-exchange relation with respect to a source of heat and from which hot water may be withdrawn at will for the preparation of the beverage, the storage tank being adapted to automatically and regulably discharge its liquid contents into the heating tank to replace the quantities of liquid withdrawn from the latter.

Another and important object of the invention is to provide a dispenser of this character in which all of the operative parts thereof are completely enclosed or encased within a fixedly mounted outer casing wherein they are concealed in an out-of-the-way position when not in use, and from which casing the various parts may be partially extended, while still supported from the casing, for pouring and mixing purposes, and thereafter certain of the parts fully extended to a supported position to facilitate serving of the beverage.

A still further object of the invention, in a dispenser of this sort, is to efficiently utilize the electrical energizing means employed for operation of the motor vehicle, i. e., the vehicle battery and generator, as the source of energizing current for the heating means associated with the heating tank and to further provide an automatically operable cut-out device which will open the electrical circuit to the heating means when the various parts are extended to their pouring and mixing positions as briefly outlined above.

Yet another object of the invention is to provide a beverage dispensing apparatus of the character set forth above in which movement of the various operative parts from their fully retracted to their partially advanced or extended pouring position may readily be accomplished utilizing but one hand and without requiring concentration on the part of the user, who, if he be the driver of the vehicle, need not necessarily take his eyes from the road. A similar and related object is the provision of a means whereby movement of the operative parts of the apparatus between their fully retracted and their partially advanced pouring position, and between this latter position and the extended serving position may be accomplished entirely by a sense of feeling during manipulation of the parts with the assurance that there will be no spilling, dripping or misapplication of the beverage during pouring operations or overfilling of the container in which the beverage is served. In carrying out this last mentioned object, the invention contemplates the provision of a storage tank or reservoir and a dispensing tank as previously outlined, wherein the latter tank has a capacity which is no greater, and in fact is somewhat less than the capacity of the container in which the beverage is served and from which it is consumed and wherein the rate of flow of the reserve liquid from the storage tank to the dispensing tank is sufficiently slow that even if pouring operations are not terminated immediately after the liquid contents of the dispensing tank have been emptied into the serving cup or container, considerable time is allowed the operator before overflow of the serving container will occur.

It is a further object of the invention to provide a dispensing apparatus including a storage reservoir and a dispensing tank as set forth above in which the flow of reserve liquid from the former container to the latter container is regulably controlled and flow operations are terminated after the dispensing container has been filled to capacity, these operations taking place automatically without necessitating the use of valves, floats, pressure devices such as diaphragms and the like, or other expensive moving parts or instrumentalities.

An additional object of the invention is to provide a beverage dispensing unit wherein the operative parts thereof are nested in a compact arrangement within the outer dispenser casing so that they occupy but little space when the unit is not in use and in which the casing is completely closed by means of a cover plate assembly which, when the parts are extended for use, serves the additional functions of supporting a serving container in operative pouring position with respect to the liquid-containing heating tank, of supporting the mixing utensil or utensils as well as the beverage ingredients in conveniently accessible positions, and finally, of supporting the serving container in a convenient position for serving purposes.

The provision of a mobile dispensing apparatus which may, in the main, be constructed from light sheet metal stampings and which therefore may be manufactured at a relatively low cost; one which is comprised of a minimum number of moving parts and which therefore is unlikely to get out of order; one which is rugged and durable and which therefore is possessed of a relatively long life; one which consumes but little electrical energy; one which is attractive in its appearance and pleasing in its design, and one which, otherwise, is well adapted to perform the services required of it are further desirable features that have been borne in mind in the production and development of the present invention.

Other objects and advantages of the invention, not at this time enumerated, will become more readily apparent as the nature of the dispensing apparatus is better understood.

In the accompanying two sheets of drawings forming a part of this specification a preferred embodiment of the invention has been shown.

In these drawings:

Figure 1 is a fragmentary perspective view of the interior of a motor vehicle and showing the improved beverage dispensing device of the present invention operatively installed therein beneath the instrument panel of the vehicle;

Figure 2 is a longitudinal sectional view taken through the device slightly to one side of the vertical central longitudinal plane thereof;

Figure 3 is a sectional view taken substantially along the line 3—3 of Figure 2;

Figure 4 is an enlarged detail sectional view taken substantially along the line 4—4 of Figure 2;

Figure 5 is a perspective view of a combined closure member and utensil supporting unit employed in connection with the present invention;

Figure 6 is a perspective view of storage tank or reservoir assembly employed in connection with the invention;

Figure 7 is a sectional view taken substantially along the plane indicated by the line 7—7 of Figure 5;

Figure 8 is an end view of an outer casing structure employed in connection with the invention with the interior beverage-dispensing instrumentalities removed;

Figure 9 is a fragmentary side elevational view of the beverage dispensing apparatus with the operative parts thereof in their pouring position; and Figure 10 is a circuit diagram of the electrical instrumentalities associated with the apparatus.

In all of the above described views similar characters of reference are employed to designate similar parts throughout.

Referring now to the drawings in detail and in particular to Figure 1, the interior of an automobile body is designated in its entirety at 10 and is equipped with the usual appointments which need not be described in detail herein but which includes an instrument panel or dashboard 12 and firewall 14 (Figure 2). The improved beverage dispensing device comprising the present invention is designated in its entirety at 16 and is shown as being mounted beneath and suspended from the underside of the panel 12, utilizing suitable mounting screws 18 for this purpose. The rear portion of the device may be supported from the firewall 14 by means of conventional perforated strip stock 20. The specific mounting means for the device forms no part of the present invention and it will be understood that, if desired, the same may be attached to the vehicle body or framework in any desired location where it is conveniently accessible for use.

The dispensing device 16 involves in its general organization three main assemblies including an outer casing assembly shown in detail in Figure 8, a combined cover, utensil-retaining and serving assembly shown in detail in Figure 5, and a liquid retaining and heating assembly which appears in its entirety in Figure 2 within the outer casing assembly.

As best seen in Figures 2, 3 and 8, the outer casing assembly is comprised of a rectangular box-like casing proper 22 having its forward end open and including top and bottom walls 24 and 26 respectively, side walls 28 and 30 respectively, and a rear wall 32. The various casing walls may be integrally formed from a one-piece flat sheet metal blank of suitable design which is bent to shape and the meeting edges of the erected structure suitably joined together as by welding. Cooperating opposed pairs of upper and lower guide rails 34 and 36 respectively are secured to the inside faces of the side walls 28 and 30 in the extreme upper and intermediate regions of these walls. A pair of guide rails 38 are similarly secured to the inside faces of the walls 28 and 30 in the extreme bottom regions of the latter. The guide rails 34 and 36 serve to slidably retain therebetween the liquid retaining and heating assembly while the guide rails 38, in combination with the bottom wall 26, defines a narrow guideway for slidably retaining an element of the cover assembly, all in a manner that will be made clear presently. A switch assembly $S_1$ and a contact element $C_1$, the nature and function of which will be set forth subsequently, are suitably mounted on the side wall 28 and rear wall 32 respectively.

Referring now to Figures 2, 3 and 9, the liquid retaining and heating assembly involves in its general organization a reserve tank or reservoir 40 adapted to contain a supply of water and which, in the mobile installation described herein, is preferably of four cup capacity. Disposed beneath the tank 40 is a smaller container 42 adapted to contain, when full, slightly less than one cup of water. The upper reserve tank 40 is generally of rectangular box-like configuration and includes top and bottom walls 44 and 46 respectively, side walls 48 and 50 respectively, a front wall 52 and a rear wall 53, the various walls constituting a substantially closed structure. The tank 40, like the casing 22, may be formed from an integral blank of sheet metal. The top wall 44 is provided with a filling opening 54 therein adjacent the forward regions thereof and preferably at a corner region as shown in Figure 3, the opening being normally closed by means of a hinged cap or lid 56. A knob or handle 58 is secured to the front wall 52 centrally thereof to facilitate withdrawal of the reservoir and the assembly with which it is associated from its retracted nested position within the casing 10 for purposes that will be described subsequently. An electrical contact element $C_1$ designed for cooperation with the contact element $C_2$ is mounted on the rear wall 53 and serves a purpose which will become clear when the operation of the apparatus is made clear. The bottom wall 46 is formed with a centrally disposed and longitudinally extending trough portion 57 (see also Figure 6) which increases in depth toward the rear of the reservoir and which is formed at its rear end with a small drip opening 59 therein through which the liquid contained within the reservoir may flow to replace liquid which may be withdrawn from the lower heating tank for purposes which will be set forth subsequently.

The side regions of the reservoir 40 are slidable in the guideways afforded by the vertically opposed pairs of guide rails 34 and 36 with the entire weight of the reservoir and its contents, as well as other structure supported thereby, resting upon the lower rails 36.

Still referring to Figures 2, 3, and 9, the lower heating tank 42 may be formed from a flat blank of sheet material and includes top and bottom walls 60 and 62 respectively, a rear wall 68 and a front wall 70. A pair of spacer members 72 welded or otherwise secured to the walls 46 and 60, serve to support or suspend the lower tank 42 from the upper reservoir 40 in spaced relationship. Such spacer members are formed of any suitable heat insulating material and as a result they thermally insulate the reservoir 40 from the lower tank 42 and thus reduce heat transfer therebetween. A short connecting nipple 74 establishes communication between the opening 59 and interior of the tank 42 as best seen in Figure 4. A horizontally disposed pipe section or fitting 76 extends forwardly from the lower regions of the front wall 70 and is, in part, supported from the bottom wall 46 of the reservoir 40 by a post 78 through which it extends. The forward end of the pipe fitting 76 carries a faucet type fitting or assembly 80 of conventional design having an operating handle 82 and a pouring spout 84 associated therewith. A standpipe 85 (Figures 3 and 9) establishes communication between the interior of the heating tank 42 and the atmosphere through the top wall 60. The standpipe 85 extends upwardly from the top wall 60 to at least the level of the top wall 44 of the reservoir.

The bottom wall 62 of the heating tank 42 is recessed as at 86 (Figure 2) and a resistance unit 88 which may be of the conventional Nichrome-ribbon type substantially fills the recess and is substantially coextensive with the bottom wall 62 so as to afford a relatively large heat-exchange area. One terminal 90 (see Figure 10) of the heating element or resistance unit 88 is grounded to the metal container 42 by a conductor 92 and the other terminal 94 thereof is connected by a flexible conductor 95 to the contact element $C_1$. The pilot lamp L is electrically connected by conductors 96 and 98 to the container 40 and contact element $C_2$ respectively. A lead wire 100 having the switch assembly $S_1$ interposed therein connects the contact element $C_2$ to the source of energizing current which, in the present instance, may be the automobile battery B.

Referring now to Figures 2, 3, 5 and 9, the cover assembly includes a rectangular cover proper 102 which is preferably in the form of a relatively thick panel of plastic material of a decorative nature and to the rear face of which there is suitably secured a backing plate 104 having a laterally turned extension or foot portion 106 formed thereon. The backing plate 104 and its extension 106 may be in the form of a sheet metal stamping of relatively heavy gauge. A friction hinge assembly designated in its entirety at 108 (see Figures 5 and 7) extends along the lower edge of the plate 104 and serves to hingedly connect the latter plate to a longitudinally slidable horizontal base plate 110, the side edges of which are confined between the bottom wall 26 and the pair of guide rails 38 (see Figure 3). A pulling knob or handle 112 is secured centrally to the outer face of the cover panel 102. When the cover panel 102 is in its closed position as shown in Figure 2, the same closes the forward open end of the outer casing 22 while the extension 106 of the backing plate 104 is nested within the extreme upper regions of the casing 22 with its side edges confined between the upper guide rails 34 and the casing top wall 24. The base plate 110 will assume the retracted position within the casing 22 in which it is shown in this view.

The cover panel is movable from the closed full line position of Figure 1 to the dotted line open position thereof by swinging the same about the axis of the hinge assembly 108 through an angle of 180° so that the panel depends vertically below the bottom wall 26 of the casing 22 with the backing plate extension or foot portion 106 extending horizontally. To effect this opening movement of the cover panel 102, it is necessary first to pull the panel forwardly and extend the cover assembly from the casing 22 so that it assumes the forward broken line position shown in Figure 2 wherein the rear edge of the extension 106 just clears the forward open rim of the casing. Thereafter, the assembly including the panel 102, backing plate 104 and extension 106 are moved bodily through an angle of 180°, after which time the thus inverted cover panel 102 may be moved rearwardly again so that the various parts assume the dotted line position thereof.

With the parts in the dotted line position shown in Figure 2, the horizontal backing plate extension or foot portion 106 serves the function of a cup holder for pouring and serving purposes. Toward this end, the extension 106 is formed with a central cup-receiving opening 114 adapted to receive the lower regions of a serving cup such as has been illustrated at 116 therein with the cup assuming an upright position. In order to catch any overflow or other liquid which may fall on the extension 106, the opening 114 is surrounded by an upstanding flange or rim 118 while the marginal free edges of the extension is likewise provided with an upstanding rim 120. The backing plate 104 has secured thereto in the medial regions thereof a spring retaining clip 122 adapted to releasably clamp in position on the plate 104 a serving utensil such as a spoon or the like 124.

As best illustrated in Figure 5, a pair of adjacent containers 126 and 128 are disposed on the slidable base plate 110 at the front end thereof and each container may be in the form of a rectangular box-like structure having a hinged lid 130 associated therewith. The bottom wall of each container may be cemented, riveted or otherwise secured to the plate 110. The two containers 126 are adapted to contain the beverage making ingredients and for the preparation of hot coffee, one of the containers may be filled with soluble powdered or so-called "instant" coffee while the other container may be filled with sugar, powdered milk, powdered cream or other coffee diluent.

In the operation of the beverage dispensing apparatus, when it is desired to prepare and serve a cup of the hot beverage, for example, hot liquid coffee, the operator will initially move the switch $S_1$ to its closed position whereupon parallel electrical circuits will be closed through the pilot lamp L and heating resistance unit 88 respectively. The circuit for the resistance unit (Figure 10) extends from the battery B, through lead 100, contacts $C_2$ and $C_1$, lead 95, resistance unit 88, lead 92, and from thence through the container bodies 42, 40 and perforated strap material 20 to the automobile framework at 14. A similar circuit exists for the pilot lamp L extending through the leads 98 and 96 to the body of the container 40.

Upon completion of the heater circuit just described, heat will be generated by the energized unit 88 and the body of water within the heating tank 42 will be heated by conduction through the bottom wall 62 until ultimately the water is brought to the proper temperature for beverage preparation. The body of water contained in the reservoir 40 will remain relatively cold inasmuch as the two containers 40 and 42 are separated by a dead air space. A small amount of heat will be applied to the upper reservoir 40 however by radiation and convection, and by conduction through the spacer members 72 although the heat lost from the body of water in the heating tank 42 is not of such proportions that the heating time for the contents of the smaller container is appreciably prolonged.

After the water within the heating tank 42 has risen to the proper temperature for beverage making operations, the operator will engage the knob 58 and pull the cover assembly including the backing plate 104 and its lateral extension 106 forwardly to the dot and dash line position shown in Figure 2 wherein the rear edge of the extension 106 clears the rim of the casing 22, after which the cover panel may be swung to its lowered position and the assembly moved rearwardly until it assumes the dotted line position in this view. A serving container or cup 116 is then inserted in the opening 114 and thereafter the handle 58 is engaged and the entire inner assembly including the reservoir 40 and heating tank 42 is pulled forwardly until the pouring spout 84 overlies the rim opening of the serving container 116. As soon as the assembly is moved from its completely retracted position, the contact $C_2$ becomes separated from the contact $C_1$ and thus the electrical circuit for the heating unit 88 is opened so that heating operations are discontinued during pouring operations. Good electrical engagement between the contacts $C_1$ and $C_2$, as well as ease of separation between the contacts and engagement thereof, is facilitated by the use of conventional radio-type banana plug and jack contact pairs.

Movement of the inner assembly forwardly to its dot and dash line pouring position as shown in Figure 2 will bring the serving container 116 and spout 84 into vertical alignment and proper pouring relation and the operator may be apprised of the attainment of this proper pouring relation by his sense of feeling when the front wall 70 of the heating tank 42 engages the rear ends of the containers 126 and 128 as shown in Figure 7.

After the desired dry ingredients have been transferred from the containers 126 and 128 to the serving container or cup 116, the handle 82 may be manipulated and the entire contents of the heating container 42 emptied into the serving cup. Inasmuch as the source of current to the heating unit 88 has been discontinued, there will be no danger of overheating due to lack of water in the tank 42. It is to be noted that the size of the nipple 74 (Figures 2 and 4) is such that the rate of replacement of liquid in the tank 42 from the reservoir 40 is relatively slow so that, after the tank 42 has been emptied, the operator need not be concerned with the immediate shutting off of the valved fitting 80. Experience with the apparatus will prompt the operator to shut off the faucet type fitting 80 after a reasonable lapse of time, after which the reservoir and heating tank assembly may be restored to the retracted full line position thereof shown in Figure 2, whereupon the contacts $C_1$ and $C_2$ again become engaged and heating operations are resumed, while at the same time liquid continues to flow through the nipple 74 to refill the heating tank 42.

For serving purposes, the cover assembly is pulled forwardly from its dotted line serving position to its dot and dash line position as shown in Figure 2 wherein the serving container or cup 116 is more conveniently accessible for serving purposes.

In order to prevent the depending portions of the cover assembly from swinging under the influence of car acceleration or deceleration, the hinge construction 103 (Figures 5 and 9) is provided with frictional clamping means whereby relative turning movement of the cover panel and the base plate 110 may be prevented. Accordingly, the hinge assembly includes a pair of hinge straps 150 and 152 secured to the backing plate 110 and base plate 104 respectively. The strap 152 is provided with two tubular ears 154 while the strap 152 is formed with a single ear 156 disposed between the ears 154. A hinge pin 158 which extends through the various ears 154 and 156 has its ends threaded and receives thereover a pair of clamping nut and washer assemblies 160 by means of which the hinge connection may be tightened to restrict relative turning movement between the straps 150 and 152 and prevent undesired swinging movement of the cover panel 102.

For the preparation and serving of a second cup of the hot beverage, the cover assembly may be restored to its dotted line position and the reservoir and heating assembly again advanced to its pouring position and the pouring process repeated, utilizing a second cup 116 in the opening 114.

It is to be noted that after the heating tank 42 has been refilled with liquid from the reservoir 40 through the nipple 74, the liquid level within the standpipe 85 will rise until it reaches the level of liquid in the reservoir 40, after which the flow of liquid through the nipple 74 will automatically be terminated. The standpipe 85 further serves the function of bleeding the interior of the heating tank 42 to the atmosphere so that pressure will not build up within the tank and prevent free entrance of liquid thereinto through the nipple 74. It should be further noted that by virtue of the slope of the bottom wall of the trough portion 57, complete drawings of the storage reservoir 40 will take place, even when the vehicle is disposed at an incline. Additionally, it will be seen that since the contact $C_1$ is fixedly mounted on the reservoir 40, the heating element which is fixedly mounted on the heating container 42 forms a permanent part of the same removable assembly including both containers. By such an arrangement, no heat is lost through any disassociation of the heating unit from the heating reservoir 42.

In order to prevent accidental pulling of the cover assembly from the outer casing 22 when the former is moved to its broken line serving position as shown in Figure 2, a pair of cooperating limit stop pins 162 and 164 are attached to the side wall 28 and base plate 110 respectively (Figures 8 and 9), the pin 162 being positioned in the path of movement of the pin 164 and adapted to be engaged by the latter when the cover assembly approaches its outermost position.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. In a mobile liquid heating and beverage dispensing apparatus, in combination, an outer casing having a forward open end and adapted to be fixedly secured to the instrument panel of an automobile body, a liquid retaining and heating assembly slidably disposed within said casing and movable from a retracted position wherein it is contained wholly within the confines of said casing to an extended pouring position wherein it projects partially from said casing, and a cover assembly including a cover panel adapted to close the open end of the casing and movable from its closed position to an open position wherein it depends below the lowermost level of the casing, a foot portion mounted on said cover panel and adapted to support a serving cup thereon when the cover panel is in its open position, said liquid retaining and heating assembly including an upper storage tank, a heating tank fixedly secured to the storage tank beneath the same and movable bodily therewith, means including a restricted orifice establishing communication between said tanks for gravity flow of liquid from the storage tank to the heating tank, a standpipe in communication with the heating tank and communicating with the atmosphere above the uppermost level of liquid in the storage tank, a pouring faucet for said heating tank at the forward end thereof, said pouring faucet overlying and being disposed wholly within the vertical confines of said foot portion when the liquid retaining and heating assembly is in its extended pouring position, and electrical heating means arranged in heat-transfer relation to the heating tank and movable bodily therewith.

2. In a mobile liquid heating and beverage dispensing apparatus, the combination set forth in claim 1 wherein the liquid capacity of said heating tank is less than the liquid capacity of said serving cup and wherein the free liquid flow capacity of said faucet is materially greater than the free liquid flow capacity of said restricted orifice.

3. In a mobile liquid heating and beverage dispensing apparatus, in combination, an outer casing having a forward open end and adapted to be fixedly secured to the instrument panel of an automobile body, a liquid retaining and heating assembly slidably disposed within said casing and movable from a retracted position wherein it is contained wholly within the confines of said casing to an extended pouring position wherein it projects partially from said casing, a cover panel adapted to close the open end of the casing, means hingedly connecting said cover panel and casing whereby the panel is capable of swinging movement relative to the casing through an angle of 180° from its closed position to an open position wherein it depends from the casing in a vertical plane, a foot portion mounted on said cover panel and projecting horizontally therefrom when the cover panel is in its open depending position and adapted to support thereon a serving cup, said liquid retaining and heating assembly including an upper storage tank, a heating tank fixedly secured to the storage tank beneath the same and movable bodily therewith, means including a restricted orifice establishing communication between said tanks for gravity flow of liquid from the storage tank to the heating tank, a standpipe in communication with the heating tank and communicating with the atmosphere above the uppermost level of liquid in the storage tank, and a pouring faucet for said heating tank at the forward end thereof and adapted to overlie said foot portion when the liquid retaining assembly is in its pouring position, and electrical heating means arranged in heat-transfer relation to the heating tank and movable bodily therewith.

4. In a mobile liquid heating and beverage dispensing apparatus, the combination set forth in claim 3 wherein said connecting means comprises a base plate slidably mounted within said casing and to which said cover panel is hingedly connected for swinging movement about a horizontal axis, said base plate being movable between a retracted position wherein said foot portion of the cover panel underlies said pouring faucet when the liquid retaining and heating assembly is in its pouring position and an extended serving position wherein said foot portion is disposed forwardly of the vertical confines of said pouring faucet.

5. In a mobile liquid heating and beverage dispensing apparatus, the combination set forth in claim 3 wherein said foot portion is in the form of a flat imperforate plate having a medial opening formed therein for reception of the lower portion of said serving cup, said plate being formed with a continuous marginal upstanding rim and said opening being surrounded by a similar upstanding rim for the retention of liquid which may be spilled on said plate.

6. In a mobile liquid heating and beverage dispensing apparatus, the combination set forth in claim 3 including, additionally, a pair of guide rails within said casing on which said upper storage tank is supported and upon which it is slidable, said guide rails constituting the sole supporting means for said liquid retaining and heating assembly within the casing.

7. In a mobile liquid heating and beverage dispensing apparatus, in combination, an outer casing having a forward open end, said casing being in the form of a rectangular box-like structure having a bottom wall, upstanding side walls, a rear wall, and a top wall, a liquid retaining and heating assembly slidably disposed within the casing and movable from a retracted position wherein it is wholly disposed within the casing to an extended pouring position wherein it projects partially from the casing, a cover panel adapted to close the open end of the casing and having a foot portion projecting into the casing from the upper edge of the panel, a base plate disposed in the bottom regions of the casing and slidable therein from a retracted position through a partially extended pouring position to a fully extended serving position, said cover panel being hingedly secured to the forward edge of said base plate for swinging movement throughout 180° from its closed position on the casing to an open position wherein it depends vertically from said base plate with said foot portion extending forwardly and horizontally therefrom, said liquid retaining and heating assembly including an upper storage tank and an underlying heating tank each having top, bottom, side, front and rear walls, the top wall of said heating tank closely underlying the bottom wall of said storage tank, means providing a restricted orifice establishing communication between said tanks through the adjacent top and bottom walls thereof, for the gravity flow of liquid therethrough, a standpipe in communication with the heating tank and communicating with the atmosphere above the uppermost level of liquid in the storage tank, a pouring faucet at the forward end of the heating tank, and electrical heating means arranged in heat-transfer relation to the heating tank and movable bodily therewith, said foot portion underlying said pouring faucet in vertical register therewith when the liquid retaining and heating assembly is in its extended pouring position, said foot portion being displaced forwardly of the faucet when the base plate is in its fully extended serving position.

8. In a mobile liquid heating and beverage dispensing apparatus, the combination set forth in claim 7 wherein the top wall of said storage tank is maintained spaced from the top wall of the casing to provide a narrow pocket for reception of the foot portion of said cover panel when the latter is in its closed position.

9. In a mobile liquid heating and beverage dispensing apparatus, the combination set forth in claim 7 including, additionally, a pair of guide rails on the side walls of said casing respectively and defining with the bottom wall of the casing guide ways in which the longitudinal edges of said base plate are slidable, said guideways serving to support the base plate in the various positions of which it is capable.

10. In a mobile liquid heating and beverage dispensing apparatus, the combination set forth in claim 7 including, additionally, cooperating abutments on said casing and base plate respectively and designed for engagement with each other when the base plate is in its fully extended serving position to prevent removal of the base plate from the casing.

11. In a mobile liquid heating and beverage dispensing apparatus, in combination, an outer casing having a forward open end, said casing being in the form of a rectangular box-like structure having a bottom wall, upstanding side walls, a rear wall, and a top wall, a liquid retaining and heating assembly slidably disposed within the casing and movable from a retracted position wherein it is wholly disposed within the casing to an extended pouring position wherein it projects partially from the casing, a cover panel adapted to close the open end of the casing and having a foot portion projecting into the casing from the upper edge of the panel, a base plate disposed in the bottom regions of the casing and slidable therein from a retracted position through a partially extended pouring position to a fully extended serving position, said cover panel being hingedly secured to the forward edge of said base plate for swinging movement throughout 180° from its closed position on the casing to an open position wherein it depends vertically from said base plate with said foot portion extending forwardly and horizontally therefrom, said liquid retaining and heating assembly including an upper storage tank and an underlying heating tank each having top, bottom, side, front and rear walls, the top wall of said heating tank closely underlying the bottom wall of said storage tank, means providing a restricted orifice establishing communication between said tanks through the adjacent top and bottom walls thereof, for the gravity flow of liquid therethrough, a standpipe in communication with the heating tank and communicating with the atmosphere above the uppermost level of liquid in the storage tank, and a pouring faucet at the forward end of the heating tank, and electrical heating means arranged in heat-transfer relation to the heating tank and movable bodily therewith, and an electric circuit for said heating means including a contact on said casing and a cooperating contact on said liquid retaining and heating assembly, said contacts being disposed in horizontal register with each other for electrical engagement when the latter assembly is in its retracted position, said contacts being adapted to become disengaged when said assembly is moved away from its retracted position.

12. In a mobile liquid heating and beverage dispensing apparatus, the combination set forth in claim 11 wherein said contact on the casing is in the form of a female connection on the rear wall of the casing and wherein said contact on the liquid retaining and heating assembly is in the form of a male connection on the rear wall of the storage tank in longitudinal register with said female connection.

13. In a mobile liquid heating and beverage dispensing apparatus, in combination, an outer casing having a forward open end, said casing being in the form of a rectangular box-like structure having a bottom wall, upstanding side walls, a rear wall, and a top wall, a liquid retaining and heating assembly slidably disposed within the casing and movable from a retracted position wherein it is wholly disposed within the casing to an extended pouring position wherein it projects partially from the casing, a cover panel adapted to close the open end of the casing and having a foot portion projecting into the casing from the upper edge of the panel, a base plate disposed in the bottom regions of the casing and slidable therein from a retracted position through a partially extended pouring position to a fully extended serving position, said cover panel being hingedly secured to the forward edge of said base plate for swinging movement through 180° from its closed position on the casing to an open position wherein it depends vertically from said base plate with said foot portion extending forwardly and horizontally therefrom, said liquid retaining and heating assembly including an upper storage tank and an underlying heating tank each having top, bottom, side, front and rear walls, the top wall of said heating tank closely underlying the bottom wall of said storage tank, means providing a restricted orifice establishing communication between said tanks through the adjacent top and bottom walls thereof, for the gravity flow of liquid therethrough, a standpipe in communication with the heating tank and communicating with the atmosphere above the uppermost level of liquid in the storage tank, and a pouring faucet at the forward end of the heating tank, the bottom wall of said heating tank being formed with a shallow recess therein exteriorly of the tank, and an electrical heater disposed wholly within the confines of said recess and in heat-exchange relation with respect to said bottom wall of the heating tank.

14. In a mobile liquid heating and beverage dispensing apparatus, the combination set forth in claim 13 including, additionally, a container for the solid beverage ingredients positioned on said base plate and disposed thereon in such a position that when the plate is moved to its advanced position a forward portion of the liquid retaining and heating assembly is adapted to strike the same and restrict further forward movement of the assembly.

15. In a mobile liquid heating and beverage dispensing apparatus, the combination set forth in claim 13 including, additionally, means on said foot portion for retaining a serving cup in pouring position when the foot portion is in its horizontal position, a container for the solid beverage ingredients positioned on said base plate and disposed thereon in such a position that when the plate is moved to its advanced position a forward portion of the liquid retaining and heating assembly is adapted to strike the same and restrict further forward movement of the assembly, said serving cup underlying said faucet when the plate is in such advanced position.

16. In a mobile liquid heating and beverage dispensing apparatus, in combination, an outer casing having a forward open end and adapted to be fixedly secured to the instrument panel of an automobile body, a liquid retaining and heating assembly slidably disposed within said casing and movable from a retracted position wherein it is contained wholly within the confines of said casing to an extended pouring position wherein it projects partially from said casing, a cover panel adapted to close the open end of the casing, means hingedly connecting said cover panel and casing whereby the panel is capable of swinging movement relative to the casing through an angle of 180° from its closed position to an open position wherein it depends from the casing in a vertical plane, a foot portion mounted on said cover panel and projecting horizontally therefrom when the cover panel is in its open depending position and adapted to support thereon a serving cup, said liquid retaining and heating assembly including an upper storage tank, a heating tank fixedly secured to the storage tank beneath the same and movable bodily therewith, the bottom wall of said storage tank closely overlying the top wall of the heating tank, a longitudinally extending trough portion formed in the bottom wall of said storage tank and having a rearwardly and downwardly inclined bottom, there being a restricted orifice formed in said trough bottom near the rear end thereof and establishing communication between said tanks for gravity flow of liquid from the storage tank to the heating tank, a standpipe in communication with the heating tank and communicating with the atmosphere above the uppermost level of liquid in the storage tank, and a pouring faucet for said heating tank at the forward end thereof and adapted to overlie said foot portion when the liquid retaining assembly is in its pouring position, and electrical heating means arranged in heat transfer relation to the heating tank and movable bodily therewith.

References Cited in the file of this patent

UNITED STATES PATENTS

| | | |
|---|---|---|
| 2,568,474 | Van Sciver | Sept. 18, 1951 |
| 2,661,015 | Allred et al. | Dec. 1, 1953 |
| 2,708,540 | Cook et al. | May 17, 1955 |